US007427952B2

(12) United States Patent
Bull et al.

(10) Patent No.: US 7,427,952 B2
(45) Date of Patent: Sep. 23, 2008

(54) AUGMENTATION OF COMMERCIAL WIRELESS LOCATION SYSTEM (WLS) WITH MOVING AND/OR AIRBORNE SENSORS FOR ENHANCED LOCATION ACCURACY AND USE OF REAL-TIME OVERHEAD IMAGERY FOR IDENTIFICATION OF WIRELESS DEVICE LOCATIONS

(75) Inventors: Jeffrey F. Bull, Chalfont, PA (US); Robert J. Anderson, Phoenixville, PA (US); Thomas Stephan Ginter, Downingtown, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 17 days.

(21) Appl. No.: 11/398,782

(22) Filed: Apr. 6, 2006

(65) Prior Publication Data
US 2006/0262011 A1    Nov. 23, 2006

Related U.S. Application Data

(60) Provisional application No. 60/669,831, filed on Apr. 8, 2005.

(51) Int. Cl.
*G01S 1/24* (2006.01)
*G01S 5/06* (2006.01)
*G01S 5/12* (2006.01)

(52) U.S. Cl. .................. 342/387; 342/453; 342/465

(58) Field of Classification Search ................ 342/387, 342/465, 453
See application file for complete search history.

(56) References Cited

U.S. PATENT DOCUMENTS

| 5,317,323 | A | * | 5/1994 | Kennedy et al. ............. 342/457 |
| 5,327,144 | A |   | 7/1994 | Stilp et al. .................. 342/387 |
| 5,608,410 | A | * | 3/1997 | Stilp et al. .................. 342/387 |
| 6,047,192 | A |   | 4/2000 | Maloney et al. ........... 455/456.2 |
| 6,169,497 | B1 | * | 1/2001 | Robert ........................ 340/988 |
| 6,204,812 | B1 | * | 3/2001 | Fattouche .................... 342/457 |

(Continued)

OTHER PUBLICATIONS

"GPS and Precision Timing Applications" Application Note 1272, Hewlett Packard, Copyright 1996, pp. 1-28.*

*Primary Examiner*—Gregory C Issing
(74) *Attorney, Agent, or Firm*—Woodcock Washburn LLP

(57) ABSTRACT

Mobile LMUs can be used in a Wireless Location System to provide detection coverage in areas lacking adequate receiver coverage. The mobile LMUs can be used to detect the radio frequency (RF) transmissions from wireless handsets and devices over a period of time to permit determination of their location. The mobile LMU's time, position, and velocity is calculated and transmitted to a SMLC along with any transmissions received from wireless devices. The SMLC analyzes and resolves the Doppler component of the wireless device while compensating for the Doppler component of the mobile LMU. The position and velocity of the wireless device can be compared with real-time imagery taken by the mobile LMU platform to accurately determine the location of the wireless device. To enhance the mobile LMU's ability to detect a signal of interest, which may be very weak and/or corrupted by noise, a process may be employed whereby the low power mobile terminals' signals are received at receiving sites and stored in memory. Then, a more powerful replica of the SOI is received at a later time from a network controller, or BTS, and this is employed to enhance the correlation processing of the SOI in memory.

30 Claims, 6 Drawing Sheets

U.S. PATENT DOCUMENTS

| | | | |
|---|---|---|---|
| 6,347,228 B1 * | 2/2002 | Ludden et al. | 455/456.5 |
| 6,407,703 B1 * | 6/2002 | Minter et al. | 342/450 |
| 6,567,044 B2 * | 5/2003 | Carroll | 342/465 |
| 6,609,064 B1 | 8/2003 | Dean | 701/213 |
| 6,782,264 B2 | 8/2004 | Anderson | 455/456.1 |
| 6,831,556 B1 | 12/2004 | Boykin | 340/539.1 |
| 6,861,982 B2 * | 3/2005 | Forstrom et al. | 342/387 |
| 6,876,859 B2 | 4/2005 | Anderson et al. | 455/456.1 |
| 7,102,570 B2 * | 9/2006 | Bar-On et al. | 342/465 |
| 2001/0006516 A1 | 7/2001 | Lee et al. | 370/355 |
| 2002/0130953 A1 | 9/2002 | Riconda et al. | 348/115 |
| 2004/0029558 A1 * | 2/2004 | Liu | 455/404.2 |
| 2004/0203429 A1 * | 10/2004 | Anderson et al. | 455/67.11 |
| 2004/0203926 A1 * | 10/2004 | Ruutu et al. | 455/456.1 |
| 2004/0266457 A1 | 12/2004 | Dupray | 455/456.5 |
| 2005/0275726 A1 | 12/2005 | Abraham et al. | 348/207.99 |

\* cited by examiner

AUGMENTATION OF COMMERCIAL WIRELESS LOCATION SYSTEM (WLS) WITH MOVING AND/OR AIRBORNE SENSORS FOR ENHANCED LOCATION ACCURACY AND USE OF REAL-TIME OVERHEAD IMAGERY FOR IDENTIFICATION OF WIRELESS DEVICE LOCATIONS

CROSS REFERENCE

This application claims the benefit of U.S. Provisional Patent Application No. 60/669,831, filed Apr. 8, 2005 entitled "Augmentation of Commercial Wireless Location System (WLS) with Moving and/or Airborne Sensors for Enhanced Location Accuracy and Use of Real-Time Overhead Imagery for Identification of Wireless Device Locations," which is hereby incorporated by reference in its entirety.

TECHNICAL FIELD

The present invention relates generally to methods and apparatus for locating wireless transmitters, such as those used in analog or digital cellular systems, personal communications systems (PCS), enhanced specialized mobile radios (ESMRs), and other types of wireless communications systems, and more particularly, but not exclusively, the present invention relates to the use of a mobile receiving station (e.g., location measuring unit (LMU)) in a Wireless Location System (WLS).

BACKGROUND

Early work relating to Wireless Location Systems is described in U.S. Pat. No. 5,327,144, Jul. 5, 1994, "Cellular Telephone Location System," which discloses a system for locating cellular telephones using novel time difference of arrival (TDOA) techniques. Further enhancements of the system disclosed in the '144 patent are disclosed in U.S. Pat. No. 5,608,410, Mar. 4, 1997, "System for Locating a Source of Bursty Transmissions."

Over the past few years, the cellular industry has increased the number of air interface protocols available for use by wireless telephones, increased the number of frequency bands in which wireless or mobile telephones may operate, and has expanded the number of terms that refer or relate to mobile telephones to include "personal communications services", "wireless", and others. The air interface protocols now include AMPS, N-AMPS, TDMA, CDMA, GSM, TACS, ESMR, GPRS, EDGE, UMTS WCDMA, and others. The changes in terminology and increases in the number of air interfaces do not change the basic principles and inventions discovered and enhanced by the inventors. However, in keeping with the current terminology of the industry, the inventors now call the system described herein a Wireless Location System.

The value and importance of the Wireless Location System has been acknowledged by the wireless communications industry. In June 1996, the Federal Communications Commission issued requirements for the wireless communications industry to deploy location systems for use in locating wireless 9-1-1 callers, with a deadline of October 2001. The location of wireless E9-1-1 callers will save response time, save lives, and save enormous costs because of reduced use of emergency response resources. In addition, surveys and studies have concluded that various wireless applications, such as location sensitive billing, fleet management, and others, will have great commercial value in the coming years.

TruePosition has continued to develop systems and techniques to further improve the accuracy of Wireless Location Systems while significantly reducing the cost of these systems. For example, the following commonly-assigned patents have been awarded for various improvements in the field of Wireless Location:

U.S. Pat. No. 5,327,144, Jul. 5, 1994, Cellular Telephone Location System;

U.S. Pat. No. 5,608,410, Mar. 4, 1997, System For Locating A Source Of Bursty Transmissions;

U.S. Pat. No. 6,047,192, Apr. 4, 2000, Robust, Efficient, Localization System; and U.S. Pat. No. 6,782,264 B2, Aug. 24, 2004, Monitoring of Call Information in a Wireless Location System.

As mentioned, there are numerous air interface protocols used for wireless communications systems. These protocols are used in different frequency bands, both in the U.S. and internationally. The frequency band generally does not impact the Wireless Location System's effectiveness at locating wireless telephones.

Air interface protocols use two types of "channels." The first type includes control channels that are used for conveying information about the wireless telephone or transmitter, for initiating or terminating calls, or for transferring bursty data. For example, some types of short messaging services transfer data over the control channel. In different air interfaces, control channels are known by different terminology but the use of the control channels in each air interface is similar. Control channels generally have identifying information about the wireless telephone or transmitter contained in the transmission. The second type of channel includes voice channels, also known as traffic channels, that are typically used for conveying voice or data communications over the air interface. These channels are used after a call has been set up using the control channels. Voice and user data channels will typically use dedicated resources within the wireless communications system whereas control channels will use shared resources. This distinction can make the use of control channels for wireless location purposes more cost effective than the use of voice channels, although there are some applications for which regular location on the voice channel is desired. Voice channels generally do not have identifying information about the wireless telephone or transmitter in the transmission.

Some of the differences in the air interface protocols are discussed below:

AMPS—This is the original air interface protocol used for cellular communications in the U.S. In the AMPS system, separate dedicated channels are assigned for use by control channels (RCC). According to the TIA/EIA Standard IS-553A, every control channel block must begin at cellular channel 313 or 334, but the block may be of variable length. In the U.S., by convention, the AMPS control channel block is 21 channels wide, but the use of a 26-channel block is also known. A reverse voice channel (RVC) may occupy any channel that is not assigned to a control channel. The control channel modulation is FSK (frequency shift keying), while the voice channels are modulated using FM (frequency modulation).

N-AMPS—This air interface is an expansion of the AMPS air interface protocol, and is defined in EIA/TIA standard IS-88. The control channels are substantially the same as for AMPS, but the voice channels are different. The voice channels occupy less than 10 KHz of bandwidth, versus the 30 KHz used for AMPS, and the modulation is FM.

TDMA—This interface is also known D-AMPS, and is defined in EIA/TIA standard IS-136. This air interface is characterized by the use of both frequency and time separation. Control channels are known as Digital Control Channels (DCCH) and are transmitted in bursts in timeslots assigned for use by DCCH. Unlike AMPS, DCCH may be assigned anywhere in the frequency band, although there are generally some frequency assignments that are more attractive than others based upon the use of probability blocks. Voice channels are known as Digital Traffic Channels (DTC). DCCH and DTC may occupy the same frequency assignments, but not the same timeslot assignment in a given frequency assignment. DCCH and DTC use the same modulation scheme, known as $\pi/4$ DQPSK (differential quadrature phase shift keying). In the cellular band, a carrier may use both the AMPS and TDMA protocols, as long as the frequency assignments for each protocol are kept separated.

CDMA—This air interface is defined by EIA/TIA standard IS-95A. This air interface is characterized by the use of both frequency and code separation. However, because adjacent cell sites may use the same frequency sets, CDMA is also characterized by very careful power control. This careful power control leads to a situation known to those skilled in the art as the near-far problem, which makes wireless location difficult for most approaches to function properly (but see U.S. Pat. No. 6,047,192, Apr. 4, 2000, Robust, Efficient, Localization System, for a solution to this problem). Control channels are known as Access Channels, and voice channels are known as Traffic Channels. Access and Traffic Channels may share the same frequency band but are separated by code. Access and Traffic Channels use the same modulation scheme, known as OQPSK.

GSM—This air interface is defined by the international standard Global System for Mobile Communications. Like TDMA, GSM is characterized by the use of both frequency and time separation. The channel bandwidth is 200 KHz, which is wider than the 30 KHz used for TDMA. Control channels are known as Standalone Dedicated Control Channels (SDCCH), and are transmitted in bursts in timeslots assigned for use by SDCCH. SDCCH may be assigned anywhere in the frequency band. Voice channels are known as Traffic Channels (TCH). SDCCH and TCH may occupy the same frequency assignments but not the same timeslot assignment in a given frequency assignment. SDCCH and TCH use the same modulation scheme, known as GMSK. The GSM General Packet Radio Service (GPRS) and Enhanced Data rates for GSM Evolution (EDGE) systems reuse the GSM channel structure, but can use multiple modulation schemes and data compression to provide higher data throughput.

Within this specification, a reference to control channels or voice channels shall refer to all types of control or voice channels, whatever the preferred terminology for a particular air interface. Moreover, there are many more types of air interfaces (e.g., IS-95 CDMA, CDMA 2000, UMTS, and W-CDMA) used throughout the world, and, unless the contrary is indicated, there is no intent to exclude any air interface from the inventive concepts described within this specification. Indeed, those skilled in the art will recognize other interfaces used elsewhere are derivatives of or similar in class to those described above.

Current Wireless Location Systems can suffer from a number of potential problems. First, current Wireless Location Systems are deployed using static or stationary ground-based receivers. While the static receivers provide coverage in their particular area, their particular coverage area is limited. Also, with respect to overlay systems in which the receivers of the Wireless Location System are co-located at base stations or cell sites of a wireless communications system, many areas throughout the United States and in the international community lack sufficient cell sites for deployment of the Wireless Location System. Finally, the static, ground-based receivers may not be adapted to provide imagery that can be helpful in determining the location of a wireless device.

SUMMARY

The following summary provides an overview of various aspects of the invention. It is not intended to provide an exhaustive description of all of the important aspects of the invention, or to define the scope of the invention. Rather, this summary is intended to serve as an introduction to the detailed description that follows.

An exemplary WLS is comprised of a number of radio receivers that are distributed throughout the geographic area where location capability is desired. In general, the radio receivers are stationary and of known location. Additionally, they are time and frequency synchronized with one another via a Global Positioning System (GPS) timing receiver. Typically, these radios are collocated with cell site equipment to permit sharing of resources such as antennas and transmission lines, multicouplers, environmentally controlled enclosure space, and power as well as backhaul communications equipment for communicating information from the cell sites to a central site or from cell site to cell site. These radios receive the radio frequency (RF) transmissions from wireless handsets and devices over a period of time to permit determination of their location (i.e., latitude and longitude) as well as their velocity and heading via time-difference-of-arrival (TDOA) and frequency-difference-of-arrival (FDOA) processing.

Location, velocity and heading determination of a wireless transmitter via TDOA/FDOA processing requires that a number of sensors receive the transmission over a period of time and that the location, velocity, and heading of each of the sensors be known during the time that the sensors acquire the signal. The typical WLS deployment utilizes many static or stationary sensors and, therefore, their velocity is zero and their heading is undefined and irrelevant. The current invention augments the typical WLS deployment by having one or more sensors, which are not collocated with cell site equipment but are part of a mobile platform. The mobile platform may be, but is not limited to, a land-roving vehicle, a watercraft, an aircraft, an amphibious vehicle, and/or a satellite. The mobile platform preferably includes a location measuring unit (LMU), which is augmented with a GPS timing receiver to provide a time and frequency reference as well as the LMU's position (i.e., latitude, longitude and elevation), velocity, and three dimensional heading at precise times. An antenna and receiver for receiving downlink transmissions from a base station, an antenna and receiver for receiving uplink transmissions from the mobile unit, and an antenna and receiver for receiving the GPS signals are preferably provided as well. A wireless communications link can also be used for providing command and control signals to the LMU and for transferring a representation of the signal-of-interest transmitted by the mobile device to be located.

Further, use of one or more mobile sensors can provide real-time imagery, and in the case of an airborne sensor, overhead imagery of the geographic area where the wireless device is located. Such imagery can be used to improve the locating accuracy of the WLS because the location of the wireless device as determined by TDOA and/or angle of arrival (AOA) measurements can be correlated with the real-time images. For example, if the location of a wireless device, provided by the wireless location system, is coincident with the location of an automobile, provided by an overhead image, then it can be assumed that the wireless device is in fact within the automobile. Thus, augmentation of airborne sensors with real-time infrared and/or airborne imagery of the targeted geographic area can enhance identification of the user of the wireless device.

Another feature described herein concerns a method that may be employed by a mobile LMU to enhance its ability to successfully detect and determine the time-of-arrival (TOA) and/or time-difference-of-arrival (TDOA) and/or frequency-difference-of-arrival (FDOA) of a transmission from a mobile station to be located. This method involves the use of a receiver configured to receive radio frequency (RF) transmissions from a wireless device, and memory for storing data samples of received transmissions. In addition, the LMU may include or be associated with a processor for correlating stored data representing a received transmission with a replica of the received transmission. In an exemplary implementation, the mobile LMU include means for receiving a downlink signal transmitted by a base transceiver station or network controller (these terms sometimes being used interchangeably herein) and for deriving the replica from the downlink signal.

Additional features and advantages of the invention will be made apparent from the following detailed description of illustrative embodiments.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The mobile LMU-enhanced WLS provides a unique location solution that allows for the operation of wireless location technologies on a variety of mobile platforms, including both aerial and terrestrial based operations. Also, the mobile LMU-enhanced WLS can provide users with a new class of location capabilities to enhance the functionality and features of existing platforms. A network-based solution can use receivers called location measuring units (LMUs), which can be installed at the cellular base stations. Location of wireless phones or other devices involves a process, similar to radio signal triangulation, known as Uplink Time Difference of Arrival, or U-TDOA.

Figure 1:
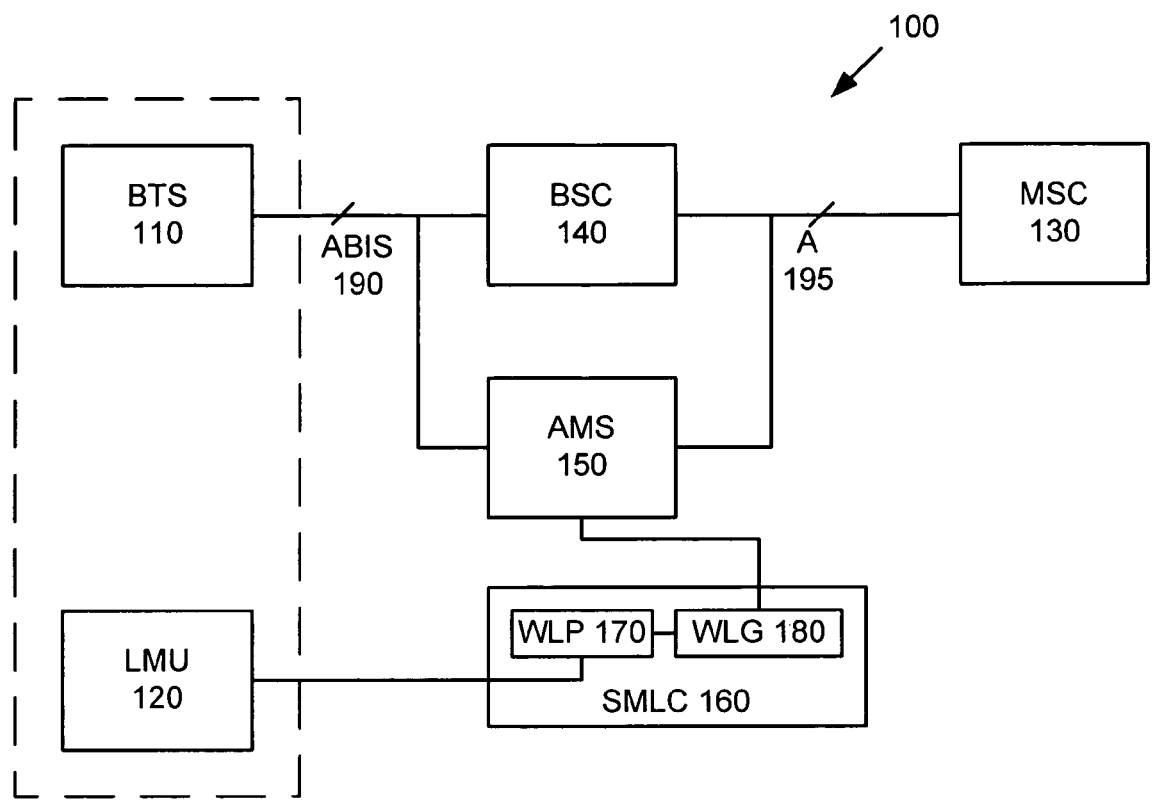
FIG. 1 is an exemplary schematic drawing depicting a Wireless Location System deployed as an overlay on a commercial GSM network in accordance with the present invention.

FIG. 1 shows the architecture of an illustrative WLS 100 deployed as an overlay on a commercial GSM network. The components of the WLS 100 include an LMU 120, a Serving Mobile Location Center (SMLC) 160, which includes a Wireless Location Processor (WLP) 170 and a Wireless Location Gateway (WLG) 180, and an Abis Monitoring System (AMS) 150. The LMU 120 is the primary component deployed at a carrier's cell sites. The LMU 120 tunes to directed frequencies to gather data for the system. The LMU 120 then forwards the collected data to the SMLC 160. The LMUs 120 in a network are preferably time and frequency synchronized through the use of the Global Positioning Network (not shown).

The WLS uses the subscriber identity, radio channel assignment, and other control information detected at the Abis interface 190 to identify which GSM radio burst is to be measured to determine a caller's position. The radio signal data used to calculate this position can be transferred between the LMU 120 and SMLC (WLP) 170 via E1/T1 backhaul. The system also comprises a Base Transceiver Station (BTS) 110, a Base Station Controller (BSC) 140, and a Mobile Switching Unit (MSC) 130.

The SMLC's two principal subsystems, the Wireless Location Processor (WLP) 170, and the Wireless Location Gateway (WLG) 180, may be constructed from commercial off-the-shelf components. The SMLC 160 typically is located at the carrier's switching location, but it can be remotely distributed to any location.

The Wireless Location Processor (WLP) 170 is preferably a high volume location-processing platform. The WLP 170 contains U-TDOA and multipath mitigation algorithms for computing location, confidence interval, speed, and direction of travel. The WLP 170 can also determine which wireless phones to locate based upon triggering from the Abis Monitoring System (AMS) 150 or requests from the $L_b$ interface to an infrastructure vendor's Base Station Controller (BSC) 140 (or MSC 130 in some cases). The WLP 170 is typically co-located at the operator's BSC 140 but can also be remotely distributed. The primary functions of the WLP 170 are to receive reports on signal detection from the LMUs 120, to perform location processing, calculation of the location estimate for each signal, and communicating with the WLG 180 regarding location records.

The WLG 180 manages the network and provides carrier access to location records. The WLG 180 is responsible for the collection and distribution of location records. The WLG 180 also maintains configuration information and supports network management. A WLG 180 can be located in any centralized facility, such as, for example, a network operations center, switching facility, or other secure facility.

The AMS 150 continuously monitors all Abis signaling links 190 (and in some cases A-interface links 195) in a GSM network to which the AMS 150 is connected. The function of the AMS 150 is to capture messages in the GSM call setup procedure for wireless devices. The AMS 150 then forwards the data contained in those messages to the WLG 180 for subsequent location processing. (See U.S. Pat. No. 6,782,264 B2, Aug. 24, 2004, Monitoring of Call Information in a Wireless Location System.)

An Element Management System (EMS) component (not shown) is the primary operator interface for the WLS. The EMS enables the WLS operators to perform network management, limited system configuration management, alarm management, and fault isolation. The EMS includes a server and multiple clients, and connects to the WLS using the WLG 180. EMS clients, which serve as EMS operator consoles, can provide varied levels of access to all elements within the network.

Figure 2:
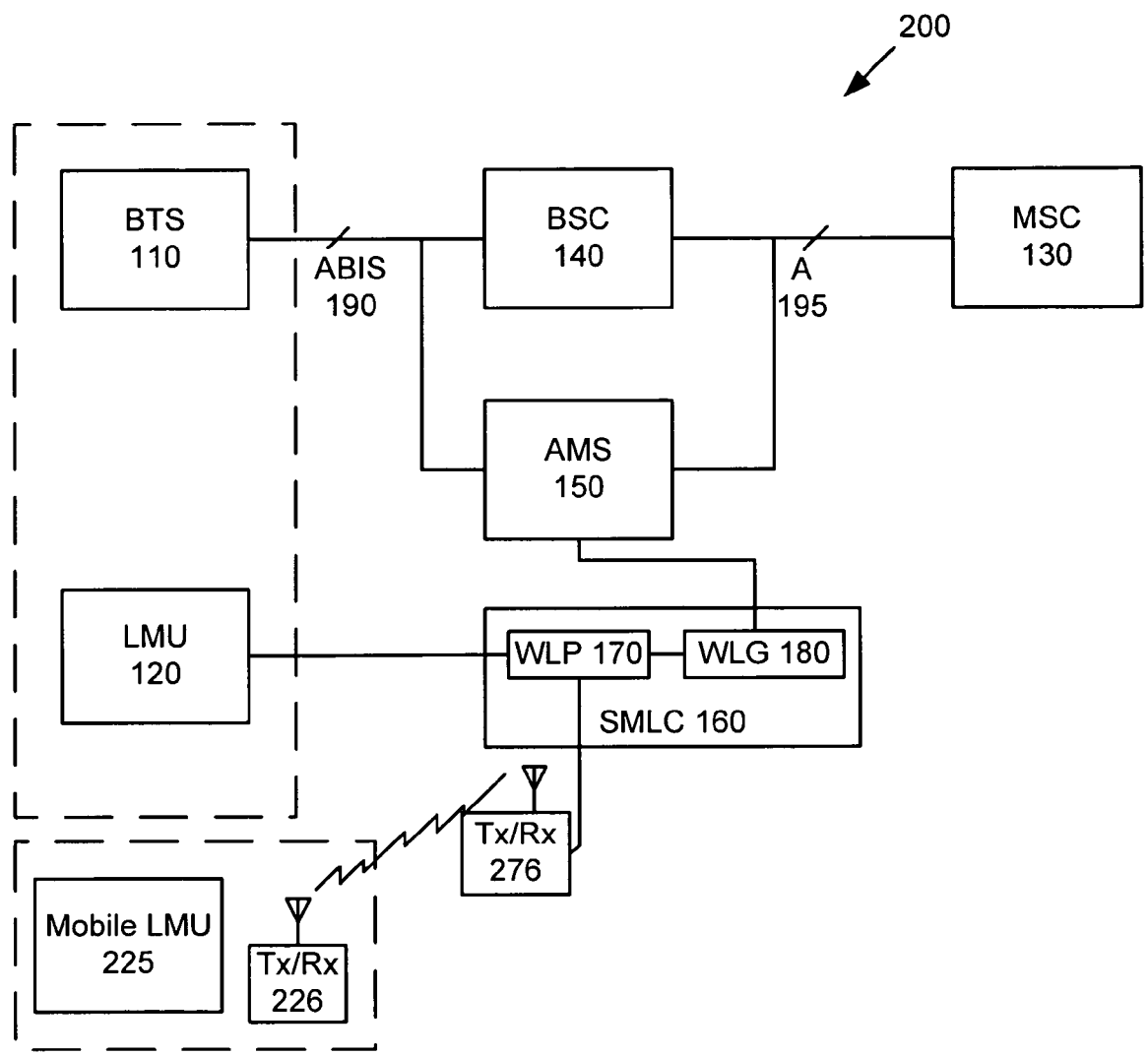
FIG. 2 is an exemplary schematic drawing depicting a Wireless Location System in accordance with the present invention.

FIG. 2 shows the exemplary architecture for a mobile LMU-enhanced WLS 200. FIG. 2 contains elements similar to those described above with respect to FIG. 1. These elements are labeled identically and their description is omitted for brevity. FIG. 2 functions similarly to the exemplary WLS 100 described above with reference to FIG. 1, except that a mobile LMU 225 transmits location data via a transmitter/receiver 226 to the transmitter/receiver 276 of the WLP 170 in the exemplary system 200. In this configuration, transceivers attached to the LMU 225 and WLG 180 provide the backhaul function for the system. The mobile LMUs 225 may be regular LMUs 120 minimally altered to include an external GPS module (not shown). The GPS module can provide the three-dimensional position of the mobile LMU. The GPS module can also provide three-dimensional vector headings and the velocity of the mobile LMU 225 as well as the frequency reference, timing, and synchronization required by an unmodified LMU 120.

The SMLC 160 analyses and resolves the Doppler component of the target mobile phone from data provided by the LMUs, both stationary 120 and mobile 225, that participate in the location and velocity estimate. The SMLC 160 performs this function to normalize the detected frequency of all LMUs detecting the mobile phone's transmissions (that is, each LMU preferably accounts for the Doppler frequency during the cross correlation process). The SMLC 160 may also perform this function to provide the value-added information of velocity and direction of bearing of the target mobile unit to end-user applications.

When the mobile LMU 225 itself is in motion, the additional Doppler component of the mobile LMU 225 is preferably determined and compensated for during estimation of the target mobile phone's position and velocity. Each mobile LMU 225 transmitting to the SMLC 160 can include additional information including the position and velocity readings of the mobile LMU 225 in its standard communications with the SMLC 160. The communications link between the mobile LMU 225 and the SMLC 160 can be a 64 kbps (DS0) low latency channel, for example. Buffering can be added at both ends of the link to accommodate packet losses and retransmission.

An exemplary mobile LMU 225 can be placed on various platforms to provide flexible coverage. For example, if the exemplary mobile LMU 225 is placed on an aircraft, the aircraft can include certain interconnections to aid in its operation. Additionally, the mobile platform can be equipped with imaging equipment (not shown) to provide real-time imagery of the surrounding area within view of the mobile platform. The imagery may be used in conjunction with the location data received by the LMU to accurately detect the location of a wireless device.

Figure 3:
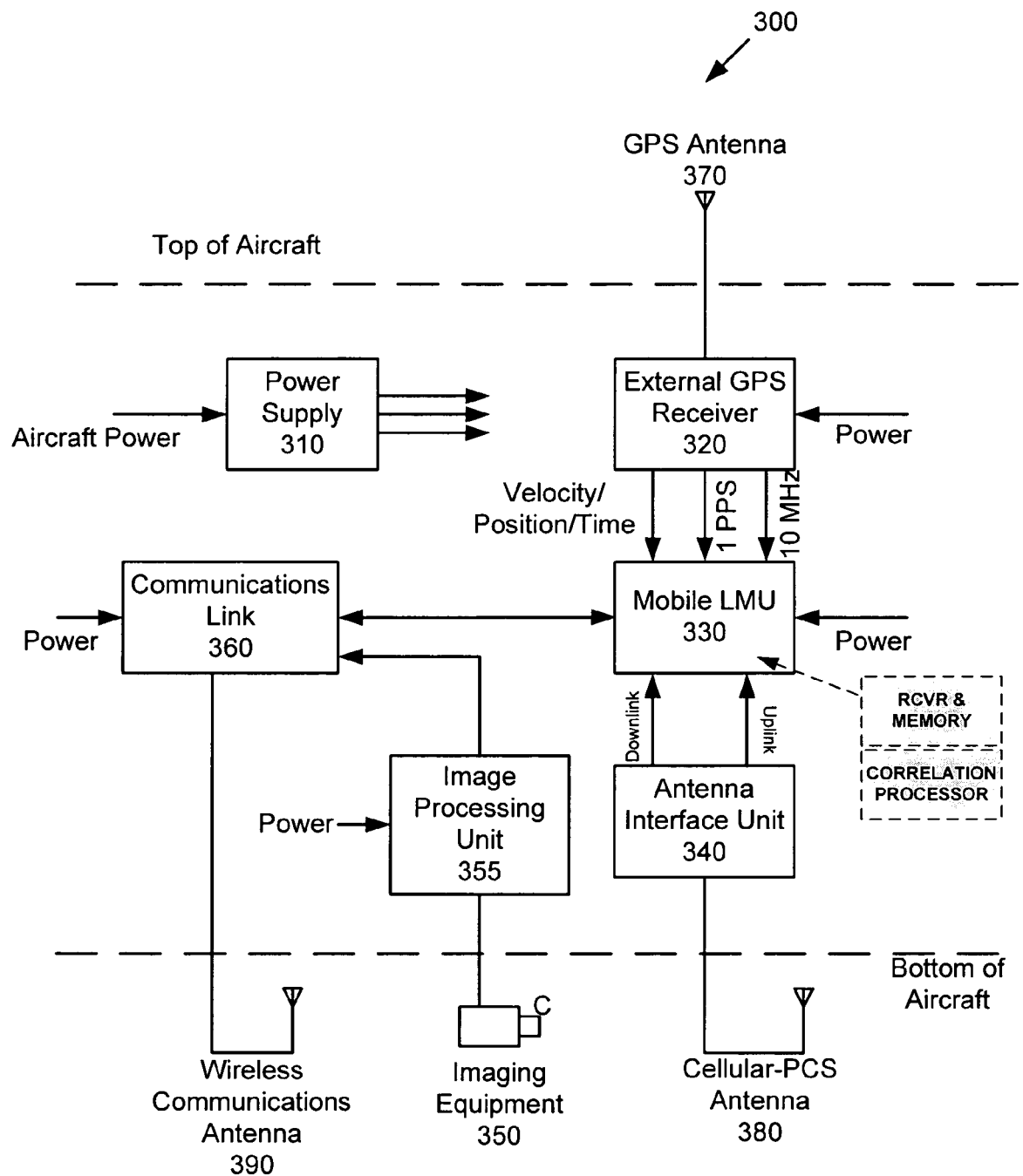
FIG. 3 is an exemplary schematic drawing depicting a deployment configuration of a mobile LMU in accordance with the present invention.

FIG. 3 is a schematic drawing depicting an exemplary deployment configuration of a mobile LMU 330 in accordance with the present invention. The interconnections may include power for the dual band mobile LMU 330, an external GPS receiver 320, an external fuselage-mounted GPS antenna fixture 370, imaging equipment 350 and imaging processing unit 355, a wiring conduit for the airborne GPS antenna 370 at a position on the aircraft that can provide a clear view of the sky, an external fuselage-mounted cellular-PCS antenna fixture 380 for the dual band uplink/downlink antenna interface unit 340 at a position on the aircraft that can provide a clear view of the ground, and an antenna interconnection 390 to the communications link 360 for communication to the ground-based SMLC (not shown). Ground-based equipment can also provide ground-to-air communication with the aircraft-based communications link 360. Interfacing with the ground-based SMLC, this equipment can permit the SMLC to control and task the mobile LMU 330 to obtain data from the mobile LMU 330 for location processing.

The mobile LMU 330 can acquire connectivity to the SMLC via a radio link. For example, a high speed X-band 802.11b communication link can provide such connectivity. Further, a single, low-latency 64 kbps data pipe to the mobile LMU can be used. Both of these system elements may be altered with a 30-millisecond buffer to allow for packet loss and retransmission delays. The aircraft may also be equipped with imaging equipment 350 and an imaging processing unit 355 to aid in detecting the location of a wireless device. The imaging equipment 350 and image processing unit 355 can be used in conjunction with the mobile LMU 330 or can be used to solely supplement static LMUs 120. The image processing unit can also include a recording device and storage unit for recording of images and storing of images for later viewing.

Figure 4:
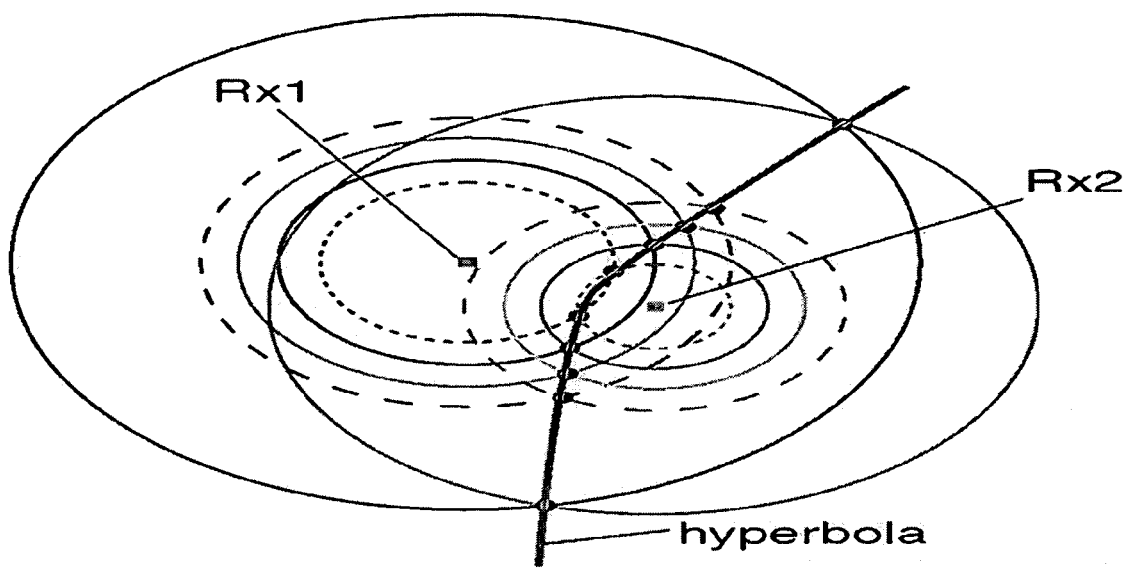
FIG. 4 is an exemplary plot representing possible distances of the wireless handset as captured by receivers in accordance with the present invention.

The U-TDOA location algorithm calculates the location of a transmitting mobile phone or similar device by measuring the difference in time of arrival of signals at different receiver sites. The mobile unit transmits a signal that is received by different receivers at times that are proportional to the distance of the transmission path between the mobile phone and each receiver. The U-TDOA algorithm does not require knowing when the mobile phone transmits; rather, it uses the time difference between pairs of receivers as the baseline measurement, generating hyperbolic data as shown schematically in FIG. 4. FIG. 4 represent an exemplary view of all possible distances of a handset from each receiver for a measured time difference. The intersection of two or more hyperbolic plots represents the position of the transmitting mobile phone.

Figure 5:
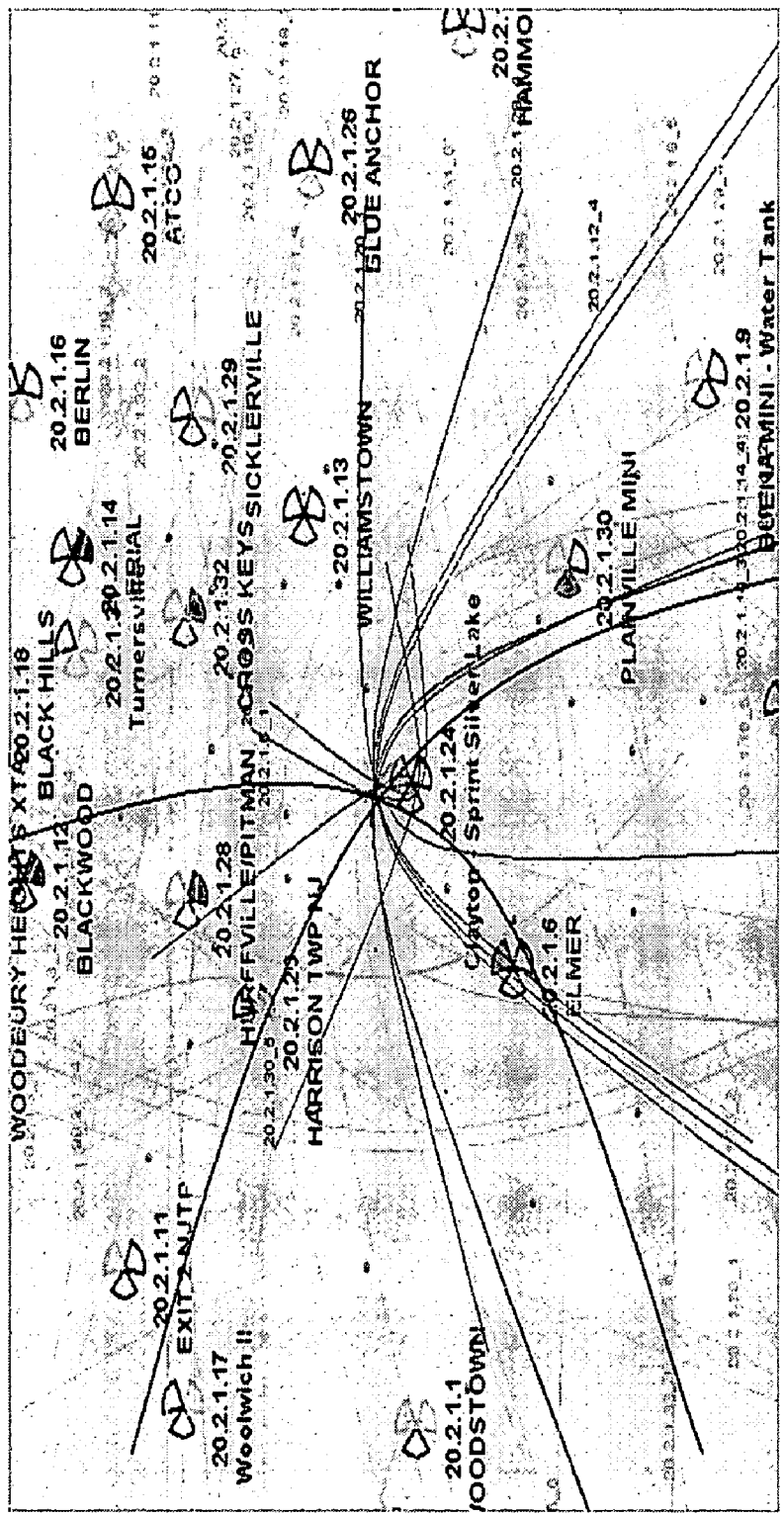
FIG. 5 is an exemplary representation of a display screen depicting an intersection of Uplink TDOA (U-TDOA) hyperbolas in accordance with the present invention.

FIG. 5 depicts an exemplary plot of the WLS determining the location of a transmitting wireless phone. The location of the wireless device is shown by the intersections of the U-TDOA hyperbolas.

The WLS is preferably designed for high volume location-based services. The WLS can use any available location resources (U-TDOA, AOA, AGPS (assisted GPS), and power measurements) to perform the requested location to the highest possible accuracy and yields. In anticipation of diverse, market-driven location applications and services, the illustrative system uses a principal of abstraction to render all location requests into a series of triggers and tasks, allocating necessary location resources as needed. As a result, the system can treat mobile LMUs and public security functions as just another location-based service.

The system can be used in a variety of public security use cases. For example, the system can be used in cases requiring "Full Network Support" where a wireless operator's network contains a WLS under normal commercial deployment conditions and the target area is currently covered by a commercial LMU deployment. The system can also be used in cases requiring "Partial Network Support" where the system installation comprises only the central office-based SMLC and AMS. While commercially deployed LMUs may be present, the coverage area of the LMUs may not coincide with the target coverage area. Thus, additional LMUs (i.e., mobile LMUs) may be needed to cover the areas of interest. In this case, the wireless operator may not provide mobile LMU-to-SMLC backhaul and grooming. Further, the system can be used in cases designated as having "No Network Support" where the WLS is independently deployed. In this case, the WLS obtains any data needed from the wireless operator's network through a third party signal intercept/decrypting monitoring system or from a similar system.

Mobile LMUs may be required to satisfy the partial-network and no-network support use cases. Mobile LMUs provide flexibility in that they can be deployed to regions that may not currently have, for example, commercially deployed LMUs in the target area where coverage is immediately desired. The mobile LMUs can also fill voids in the WLS where, for example, a commercial LMU is deactivated for maintenance purposes.

The mobile LMUs can be terrestrial as well as airborne. The mobile LMUs can be implemented as fully mobile (e.g., mounted in an airplane) or as temporary installations (e.g., Cell-site on Wheels or COW, or blimp-mounted).

We will now describe a method that can be used to improve the mobile LMU's ability to detect a weak, noisy, and/or interference corrupted noisy signal-of-interest.

Enhancement of Low Power Signals Through Their Higher Power Delayed Replicas

Many network controllers in multi-user communications networks retransmit data received from transmissions from subscriber terminals back to the terminals as a method of verification to the subscriber that it is the terminal that is communicating with the network controller. This can be used to advantage to assist in locating wireless terminals (e.g. mobile phone or similar wireless device) by enhancing the terminal's signal with respect to undesired interference and noise. (In the case of a wireless communications network, such as a GSM network, the serving BTS may act as the network controller and thus perform the retransmission function.) This occurs because the network controller's signal is often more accessible and powerful than the signal transmitted directly from the power-limited mobile terminal. The following example illustrates the concept.

Consider a wireless GSM network comprising multiple base transceiver stations distributed about a geographic area over which the GSM network provides wireless communications coverage. The density of the base stations in the wireless network is determined by a number of factors. Typically, a base station can serve many wireless terminals in its general vicinity and, therefore, the density of wireless terminals is much greater than the density of base stations. Locating a wireless terminal with time difference of arrival (TDOA) may entail a process including receiving the wireless terminal's signal at multiple time-synchronized receiving sites and correlating the signals at each of these sites with a replica of the signal to measure a precise time of arrival (TOA), which in turn may be used to compute the TDOA. (See, e.g., U.S. Pat. No. 5,327,144, Jul. 5, 1994, Cellular Telephone Location System; and U.S. Pat. No. 6,047,192, Apr. 4, 2000, Robust, Efficient, Localization System.) Often, however, it is difficult to get a good replica of the signal-of-interest (SOI), i.e., the wireless terminal's signal, because the receiving sites are located at a significant distance from the wireless terminal and the SOI is characterized by a low signal to noise ratio (SNR), i.e., the SOI may be low in power and corrupted by interference from other wireless terminals as well as other noise. However, these weak, interference-corrupted signals may be successfully detected and time stamped so as to enable location of the wireless terminal, by incorporating time-stamped memory into the receiving sites in the manner described by the above-cited U.S. patents.

A similar process may be employed in accordance with the present invention, by receiving the SOI and storing it in memory and sometime later receiving the signal from the network controller. The network controller's transmission of a more powerful repeat of the SOI, after the wireless terminal has already transmitted its signal to the network controller, may be leveraged to facilitate matched replica correlation in order to successfully detect the SOI where it might otherwise be too weak or corrupted for use in location processing. This is possible because the network controller's signal is often more powerful and less corrupted by interference. Thus, the wireless terminals transmission can be reconstructed from the information received from the network controller's signal and used in the correlation process to enhance the SOI stored in the time-stamped memory at each of the receiving sites. In summary, a key aspect of this approach is to receive the low power mobile terminals' signals at receiving sites, store them in time-stamped memory, receive the more powerful replica of the SOIs at a later time from the network controller, and enhance the correlation processing of the SOIs in memory through the use of the network controller's higher fidelity replicas of the SOIs. This process may include demodulating the "strong" signal to recover the digital data transmitted by the RF signal, and then re-modulating the data in order to provide a high fidelity replica of the SOI as originally transmitted by the mobile terminal to be located. The SOI's precise time of arrival may be determined by correlating, or cross-correlating, the high fidelity RF signal replica with the stored copy of the RF signal received by the LMU. This permits location determination via TDOA in scenarios where it would not be possible.

We will now address the problem of locating mobile terminals (MSs) that utilize commercial land based GSM wireless networks from airborne vehicles and unattended airborne vehicles (UAV) without any connection, or cooperation, from the network. This may be done, e.g., for law enforcement/military/intelligence applications. This problem may be addressed by determining characteristics of the SOI so that it can be used in the TDOA/FDOA, and similar, signal processing. The above-described technique can be employed to extract characteristics of the SOI by monitoring the base transceiver station (BTS) transmissions to the mobile. In GSM networks, the mobile station (MS) interacts with the BTS via control channel signals to effectuate successful wireless phone calls and data transmissions. The BTS repeats the data received from the MS on a control channel, immediately after it receives it, for certain wireless transactions. For example, when a mobile originates a call, the data the mobile transmits to the BTS on a control channel in the CM_SERV_REQ message is repeated back to the mobile in the BTS's very next transmission to the mobile. Since the density of BTSs over a geographic area is typically much less than that of mobiles over the same geographic area, and the BTSs transmit with greater power than mobiles and utilize more efficient antennas than the mobiles, the BTS transmissions typically will be more easily received in an airborne platform over the geographic area than the mobiles' transmissions. Thus, the transmissions from the BTS to the mobile will be received by the UAVs and the mobile's information extracted from these received transmissions. This information can be used to enhance the reception of the mobiles' transmissions by the radio receivers in the UAVs. However, the BTS transmits this information after the mobile has transmitted it so a mechanism is employed to record the mobiles' transmissions at the UAVs so these can be processed after the information is received by the UAVs from the BTSs. The basic steps in this process are to (1) receive and record the transmissions from the mobile at the UAV; (2) receive and record the transmission from the BTS at the UAVs; (3) extract the mobile's information from the transmissions from the BTS, and (4) utilize this information to enhance the transmission received from the mobile.

This approach can also be applied to the use of adaptive antenna arrays on the UAVs to simultaneously enhance the mobiles' signal at the UAVs while reducing the effect of the interference from the undesired mobiles on the same frequency through the spatial filtering provided by the adaptive antenna arrays.

Figure 6:
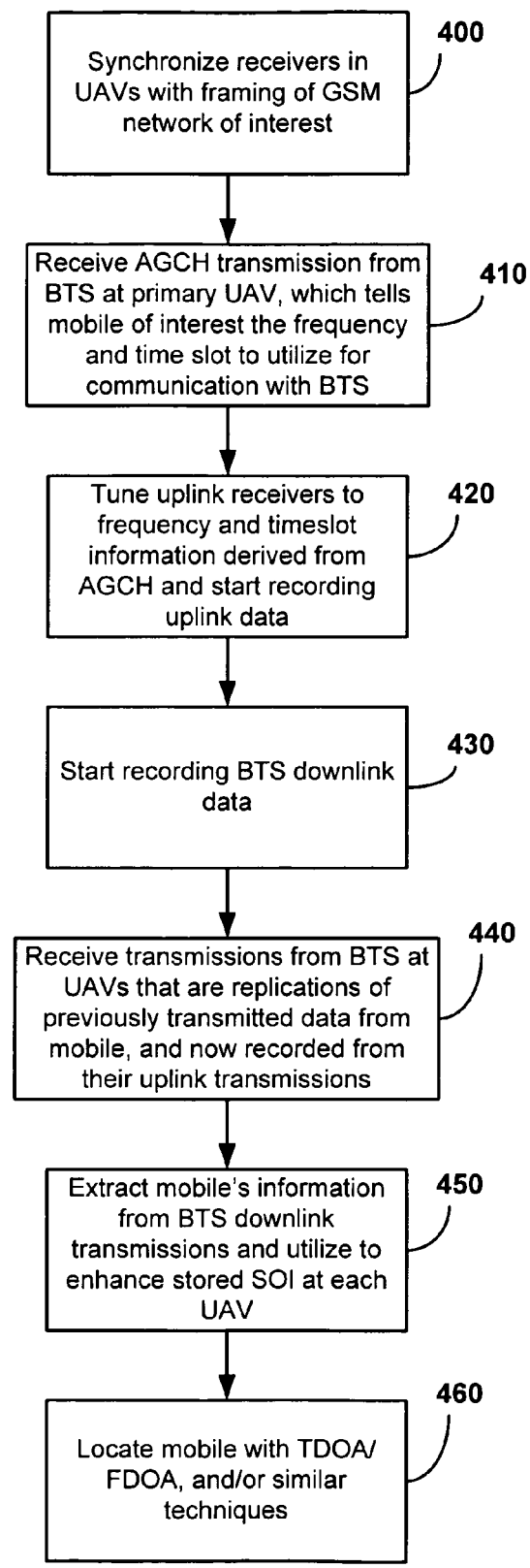
FIG. 6 is a flowchart of an illustrative implementation of a process for enhancing low power signals through their higher power delayed replicas.

An illustrative implementation of a process for improving signal detection in an airborne (or ground-based mobile) LMU may involve the use of uplink and downlink receivers on all of the UAVs involved that cover the frequency bands of interest. This is illustrated in the flowchart of FIG. 6. The uplink and downlink receivers are time and frequency synchronized with one another through the use of GPS timing receivers. The steps include:

1. Synchronize the receivers in the UAVs with the framing of the GSM network of interest (400).
2. Receive the AGCH transmission from the BTS at the primary UAV, which tells the mobile of interest the frequency and time slot to utilize for communication with the BTS (410).
3. Tune uplink receivers to the frequency and timeslot information derived from the AGCH and start recording uplink data (420).
4. Start recording BTS downlink data (430).
5. Receive transmissions from BTS at UAVs that are the replications of the previously transmitted data, and now recorded from their uplink transmissions, from the mobile. (440).
6. Extract the mobile's information from the BTS downlink transmissions and utilize it to enhance the stored SOI at each UAV (450).
7. Locate the mobile with TDOA/FDOA, and/or similar techniques (460).

CONCLUSION

The true scope the present invention is not limited to the illustrative and presently preferred embodiments disclosed herein. For example, the foregoing disclosure of a Wireless Location System uses explanatory terms, such as network controller, LMU, BTS, BSC, SMLC, and the like, which should not be construed so as to limit the scope of protection of this application, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. In such non-TDOA systems, the SMLC described above would not be required to perform TDOA calculations. Similarly, the invention is not limited to systems employing LMUs constructed in a particular manner, or to systems employing specific types of receivers, computers, signal processors, etc. The LMUs, SMLC, etc., are essentially programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the SMLC) described herein to another functional element (such as the LMU) without changing the inventive operation of the system. In many cases, the place of implementation (i.e., the functional element) described herein is merely a designer's preference and not a hard requirement. Accordingly, except as they may be expressly so limited, the scope of protection is not intended to be limited to the specific embodiments described above.

In addition, any reference herein to control channels or voice channels shall refer to all types of control or voice channels, whatever the preferred terminology for a particular air interface. Moreover, there are many more types of air interfaces (e.g., IS-95 CDMA, CDMA 2000, and UMTS WCDMA) used throughout the world, and, unless the contrary is indicated, there is no intent to exclude any air interface from the inventive concepts described within this specification. Indeed, those skilled in the art will recognize other interfaces used elsewhere are derivatives of or similar in class to those described above.

What is claimed:

1. A mobile LMU-enhanced wireless location system (WLS), comprising:
    a WLS comprising a plurality of stationary location measuring units (LMUs) overlaid on a commercial wireless communications system such that said plurality of LMUs are collocated with respective base transceiver stations (BTSs) of said wireless communications system; and
    a mobile platform supporting a mobile LMU and a Global Positioning System (GPS) module, wherein the GPS module is configured to provide a time and frequency reference as well as data representing the position and velocity of the mobile LMU, and wherein said mobile LMU includes a downlink receiver configured to receive a downlink signal from a base transceiver station and for deriving a replica signal from said downlink signal, said replica signal representing a replica of a transmission received at said base transceiver station, and wherein said mobile LMU further includes a receiver configured to receive uplink radio frequency (RF) transmissions from a wireless device and memory for storing data samples of received transmissions, wherein said mobile platform further supports a correlation processor configured to correlate stored data representing a received transmission with a replica of said received transmission received via said downlink signal.

2. A system as recited in claim 1, wherein said mobile platform comprises an aircraft.

3. A system as recited in claim 1, wherein said mobile platform comprises a ground-based vehicle.

4. A system as recited in claim 1, wherein the mobile platform further comprises antennae and receivers configured to receive downlink transmissions from a base station, uplink transmissions from a mobile station, and GPS signals.

5. A system as recited in claim 1, wherein the mobile platform further comprises a wireless communications link configured to receive command and control signals from a ground station and to provide said command and control signals to the mobile LMU.

6. A system as recited in claim 1, wherein said mobile platform comprises an aircraft; wherein said mobile LMU comprises a receiver configured to receive radio frequency (RF) transmissions from a wireless device, and memory for storing data samples of transmissions received by said receiver; further comprising a processor for correlating stored data representing a transmission received by said receiver with a replica; further comprising means for receiving a downlink signal from a base transceiver station and for deriving said replica from said downlink signal; further comprising at least one stationary LMU at a known location, wherein the at least one stationary LMU and the mobile LMU are configured to be time and frequency synchronized with one another; wherein said at least one stationary LMU is collocated with cell site equipment to permit sharing of resources including an antenna, environmentally controlled enclosure space, power, and backhaul communications resources; wherein the mobile LMU and the stationary LMU are configured to receive radio frequency (RF) transmissions from wireless devices over a period of time to permit determination of their location and velocity via time-difference-of-arrival (TDOA) and frequency-difference-of-arrival (FDOA) processing; wherein, for the determination of the wireless devices' location and velocity via TDOA and FDOA processing, the system is configured such that a plurality of LMUs receive a signal from the wireless device over a period of time and that the location and velocity of each LMU is known during the time that the signal is being received; wherein the mobile platform comprises antennae and receivers configured to receive downlink transmissions from a base station, uplink transmissions from a mobile station, and GPS signals; wherein the mobile platform further comprises a wireless communications link configured to receive command and control signals from a ground station and to provide said command and control signals to the mobile LMU; wherein the at least one mobile platform comprises an imaging device configured to provide imagery of the geographic area in which a wireless device to be located is deployed; and further comprising means for associating the location of the wireless device provided by the WLS with the imagery.

7. A system as recited in claim 1, comprising means for receiving a downlink signal from a network controller and for deriving said replica from said downlink signal.

8. The system as recited in claim 1, further comprising at least one stationary LMU at a known location, wherein the at least one stationary LMU and the mobile LMU are configured to be time and frequency synchronized with one another.

9. A system as recited in claim 8, wherein said at least one stationary LMU is collocated with cell site equipment to permit sharing of resources including an antenna, environmentally controlled enclosure space, power, and backhaul communications resources.

10. A system as recited in claim 8, wherein the mobile LMU and the stationary LMU are configured to receive radio frequency (RF) transmissions from wireless devices over a period of time to permit determination of their location and velocity via time-difference-of-arrival (TDOA) and frequency-difference-of-arrival (FDOA) processing.

11. A system as recited in claim 10, wherein, for the determination of the wireless devices' location and velocity via TDOA and FDOA processing, the system is configured such that a plurality of LMUs receive a signal from the wireless device over a period of time and that the location and velocity of each LMU is known during the time that the signal is being received.

12. A system as recited in claim 1, wherein at least one mobile platform comprises an imaging device configured to provide imagery of the geographic area in which a wireless device to be located is deployed.

13. A system as recited in claim 12, further comprising means for associating the location of the wireless device provided by the WLS with the imagery, whereby additional information about the location of the wireless device is provided.

14. A system as recited in claim 12, wherein the imaging device is capable of infrared imaging.

15. A method for locating a mobile station (MS) operating within a region covered by a wireless location system (WLS), comprising:
receiving a transmission from the MS at at least three geographically separated signal collection sites, including at least one mobile location measurement unit (LMU);
transmitting a downlink signal from at least one signal collection site or network controller, said downlink signal including data permitting said mobile LMU, after receiving said downlink signal, to derive a replica of said transmission from the MS as received at a signal collection site;
at said mobile LMU, performing correlation processing on said replica and the transmission from the MS as received at the mobile LMU to determine one of time of arrival (TOA) and time difference of arrival (TDOA) data at said mobile LMU; and
using the TOA or TDOA data determined at the mobile LMU to estimate a location of the MS.

16. A method as recited in claim 15, further comprising providing images of the area surrounding the location of the MS for comparison with the estimated location of the MS.

17. A method as recited in claim 16, wherein the images are recorded and saved.

18. A method as recited in claim 15, further comprising providing a time and frequency reference as well as a three dimensional position and velocity of the mobile LMU through the use of a GPS module mounted on the mobile platform.

19. A method as recited in claim 18, further comprising compensating for the three dimensional position and velocity of the mobile LMU when estimating the location of the MS using time difference of arrival (TDOA).

20. A method as recited in claim 15, further comprising digitizing and storing the MS transmission as received by the mobile LMU, and then correlating the stored transmission with a replica of the MS transmission.

21. A method as recited in claim 20, further comprising deriving said replica from a downlink transmission from a base transceiver station.

22. A method as recited in claim 20, further comprising deriving said replica from a downlink transmission from a network controller.

23. A mobile system for use in a wireless location system (WLS), comprising: a location measuring unit (LMU) borne by a mobile platform, said LMU comprising a receiver configured to receive radio frequency (RF) transmissions and memory for storing data samples of received transmissions; a GPS module borne by said mobile platform and operatively coupled to said mobile LMU, wherein said GPS module determines the three dimensional position and velocity of the mobile LMU, as well as a frequency reference and precise time; and a downlink receiver configured to receive a downlink signal from at least one BTS or network controller, said downlink signal including data permitting said LMU to derive a replica of a transmission from mobile station (MS) as received at a signal collection site remote from said mobile system, and a processor configured to correlate stored data representing a received transmission with a replica of said received transmission.

24. A mobile system as recited in claim 23, wherein the mobile platform comprises an aircraft.

25. A mobile system as recited in claim 23, wherein the mobile LMU is configured to receive radio frequency (RF) transmissions from wireless devices.

26. A mobile system as recited in claim 25, wherein said mobile platform comprises antennae configured to receive downlink transmissions from a base transceiver station, uplink transmissions from a mobile station, and GPS signals.

27. A mobile system as recited in claim 26, wherein the mobile platform further comprises a wireless communications link configured to provide command and control signals to the mobile LMU.

28. A mobile system as recited in claim 23, wherein the mobile platform further comprises an imaging device.

29. A mobile system as recited in claim 28, further comprising means for associating the location of the wireless device with imagery obtained by said imaging device.

30. A mobile system as recited in claim 28, wherein the imaging device is configured to provide infrared imagery.

* * * * *

UNITED STATES PATENT AND TRADEMARK OFFICE
CERTIFICATE OF CORRECTION

PATENT NO. : 7,427,952 B2
APPLICATION NO. : 11/398782
DATED : September 23, 2008
INVENTOR(S) : Jeffrey F. Bull et al.

It is certified that error appears in the above-identified patent and that said Letters Patent is hereby corrected as shown below:

On Title Page

Item (56) References Cited
Insert --FOREIGN PATENT DOCUMENTS--.
Insert --WO 2001/065271     09/2001--.

On Title Page

Item [75] Inventors
Delete "Downingtown, PA (US)" and insert --Downingtown, PA (Canada)-- therefor.

Signed and Sealed this

Twenty-third Day of December, 2008

JON W. DUDAS
*Director of the United States Patent and Trademark Office*